United States Patent [19]

Brenner et al.

[11] Patent Number: 5,274,823
[45] Date of Patent: Dec. 28, 1993

[54] INTERRUPT HANDLING SERIALIZATION FOR PROCESS LEVEL PROGRAMMING

[75] Inventors: Larry B. Brenner, Stone Ridge; Barry P. Lubart; Jeffrey S. Lucash, both of Hurley; John C. Rathjen, Jr., Rhinebeck; Ronald Sasala, Hurley; Thomas Van Weaver, Woodstock, all of N.Y.

[73] Assignee: International Business Machines Corporation, Armonk, N.Y.

[21] Appl. No.: 860,829

[22] Filed: Mar. 31, 1992

[51] Int. Cl.⁵ .............................................. G06F 13/14
[52] U.S. Cl. ............................. 395/725; 364/DIG. 1; 364/230; 364/246.8; 364/242.2; 364/281.3
[58] Field of Search ................ 395/650, 725, 325, 425

[56] References Cited

U.S. PATENT DOCUMENTS

| | | | |
|---|---|---|---|
| 4,574,350 | 3/1986 | Starr | 395/725 |
| 4,584,644 | 4/1986 | Larner | 395/650 |
| 4,587,609 | 5/1986 | Boudreau et al. | 395/725 |
| 4,604,694 | 8/1986 | Hough | 395/650 |
| 4,665,484 | 5/1987 | Nanba | 395/650 |
| 4,891,749 | 1/1990 | Hoffman et al. | 395/425 |
| 4,920,485 | 4/1990 | Vahidsafa | 395/725 |
| 4,979,105 | 12/1990 | Daly et al. | 395/575 |
| 5,129,089 | 7/1992 | Nielsen | 395/725 |
| 5,161,227 | 11/1992 | Dias et al. | 395/725 |

*Primary Examiner*—Debra A. Chun
*Attorney, Agent, or Firm*—W. A. Kinnaman, Jr.; M. S. Walker

[57] ABSTRACT

A method for serializing access to computer system resources without disabling interrupts in critical code sections or requiring excessive use of spin locks. A queue lock is introduced that allows an interrupt process to enqueue and be processed in turn without a spin lock and to block process code access to a particular resource until all interrupts are processed. Process level code is blocked from accessing a locked resource while requests for accesses from interrupt level code are queued in a deferred work queue which is processed prior to the release of the blocking lock. Establishment of deferred work queue means that processing can continue without disablement of interrupts and without significant overhead consumed by processes holding spin locks.

11 Claims, 2 Drawing Sheets

INTERRUPT HANDLING SERIALIZATION FOR PROCESS LEVEL PROGRAMMING

BACKGROUND OF THE INVENTION

1. Field of the Invention

The present invention relates to computer operating systems and more particularly to operating system features that serialize access to computer system resources. More particularly, the present invention relates to a method of serializing resource access for interrupt processing without requiring spinning or interrupt disablement over the critical interrupt processing code section protected by the invention.

2. Background of the Invention

Multiprocessing computer systems are computers with more than one processor (Central Processing Unit or CPU) for executing instructions. Operating systems for multiprocessing computer systems dispatch tasks to each processor for execution according to scheduling algorithms designed to maximize system throughtput.

Multiprocessing systems, such as the IBM ES/9000 family of computers, frequently share resources between the processors including memory, permanent storage devices, such as disks or tapes, and other peripheral devices such as communications controllers. These devices operate serially, that is, they must complete processing associated with a request from a first processing unit before beginning processing of the next request. Control of access to resources is termed "serialization" meaning that requests access to a resource are ordered and processed one at a time.

Operating systems generally have at least two levels of programming code: process level code and interrupt level code. Process level code is the program code that performs the necessary processing to calculate a number or request that data be stored to a file. Interrupt level code processes exceptions generated as interrupts from the various resources. Interrupts are used because the peripheral devices such as disks, tapes, and to a lesser extent memory operate at speeds much slower than the processor. A processor may request that a file be stored on a disk (in process level code). Once started, the processor suspends that task until the storing is completed. The disk resource signals the processor that it has completed by sending an interrupt. This interrupt may or may not be processed by the processor initially requesting the resource action. The interrupt must be processed on a priority basis and may require certain actions by the processor to continue work. Access to the interrupt code must be serialized so that no more than one processor is taking action with respect to a single resource at one point in time.

Serialization of process access to resources has typically involved the establishment of a "lock" on that resource. The lock can be held by at most one processor at a time. The lock is frequently implemented as a location in memory that contains one pattern of data when available and another when in use. A process seeking to obtain a lock can typically take one of two actions if the lock is presently held by another processor: it may suspend, placing the requesting process in a wait state and passing control to a runnable process; or it may spin, periodically checking to see whether or not the lock has been released. Each of these techniques has certain advantages and disadvantages. The suspend action increases the overhead as the processor must undergo the context switching overhead of changing processes. It has the advantage of using processor time more efficiently by continuing work on another pending processes. The spin lock has the disadvantage of consuming system resources continuously checking to determine whether the lock is available. It has the advantage of being able to quickly begin processing once the lock is freed.

A further disadvantage in spin lock implementations is the requirement that interrupts be disabled while the spin lock is held. Disabling of interrupts tends to degrade processor performance and is generally undesirable.

Prior art systems for serializing resource access have employed both suspend and spin locks. For example, U.S. Pat. No. 4,663,709 to Fujiwara et al., describes a serialization control system for serializing access to shared data. U.S. Pat. No. 4,604,694 to Hough (commonly assigned) discloses a method of controlling shared and exclusive access to a resource by establishing deferred task queues. U.S. Pat. No. 4,271,468 to Christensen et al., discloses apparatus and methods for handling input/output unit interrupts. Each of these systems, however, suffers from the loss of efficiency due to locking overhead and disablement of interrupts.

Thus, a problem exists in increasing the performance of a multiprocessing system by reducing the overhead of serialization. This technical problem includes reducing processor overhead consumed by spin locks and reducing inefficiencies introduced by running the process level code disabled for interrupts.

SUMMARY OF THE INVENTION

Accordingly, it is an object of this invention to provide a serialization mechanism that avoids spinning or disabling of interrupts in the critical section of process level code protected by this mechanism. It is a further object of the invention to increase processor efficiency by reducing serialization overhead. It is yet another object of the invention to provide a mechanism that assures that all outstanding interrupts are processed before process level code execution resumes.

The present invention can be summarized as a method for serializing access to a resource shaled by a plurality of computer processors. The processors are all operating to execute process level code, and interrupt level code. The method comprises the steps of: testing the request to determine whether or not it is interrupt code; testing a resource lock to determine resource availability; if the resource is available, assigning the resource lock to that request and performing that request; if the lock is not available and if not interrupt code, blocking the request and causing the requesting process to wait; if interrupt code, adding the interrupt to a deferred interrupt queue waiting for the resource; releasing the blocking lock only when all interrupt requests have been processed from the interrupt queue.

DETAILED DESCRIPTION OF THE INVENTION

A multiprocessor computer system has several processing units (CPUS) available for instruction execution. The preferred embodiment of the present invention operates in conjunction with the AIX operating system. (AIX is a trademark of the IBM Corporation.) The processes and instruction streams in AIX are divided into three basic types: user processes performing the work of a user application program; kernel processes performing basic system services; and interrupt processes servicing interrupts from attached devices. The present invention is not limited to the AIX operating system, however, and is applicable to other operating systems such as the UNIX operating system (UNIX is a trademark of UNIX Systems Laboratories).

Figure 1:
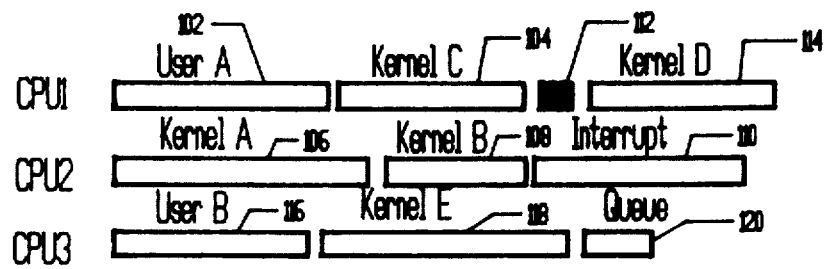
FIG. 1 is a diagram illustrating the flow of execution according to the present invention on a multiprocessor computer system.

Process level code includes both user processes and kernel processes. User processes call the kernel processes to perform system level services. Interrupts are processed by an interrupt handler (interrupt code) and must be serialized to avoid corruption of data. FIG. 1 is an example process timeline of a system using the method of the present invention. As shown in FIG. 1, each processor in a complex of, for example, three processors, executes a separate process. CPU1 is shown first executing the process USER A 102 which then switches to KERNEL C 104. CPU2 executes KERNEL A 106 switching to KERNEL B 108. An interrupt 110 is raised and accepted for processing by CPU2. CPU1 attempts to start a user process which accesses the resource locked by interrupt 110 and is blocked 112. CPU1 places the blocked process in a wait state and initiates execution of KERNEL D 114. CPU3 initially executes process USER B 116 switching to KERNEL E upon completion. A new interrupt is raised and handled by CPU3 120. Assuming the interrupt requires the same resource as interrupt 110, interrupt 120 is added to the queue for deferred processing and CPU3 goes on to other work.

Figure 2:
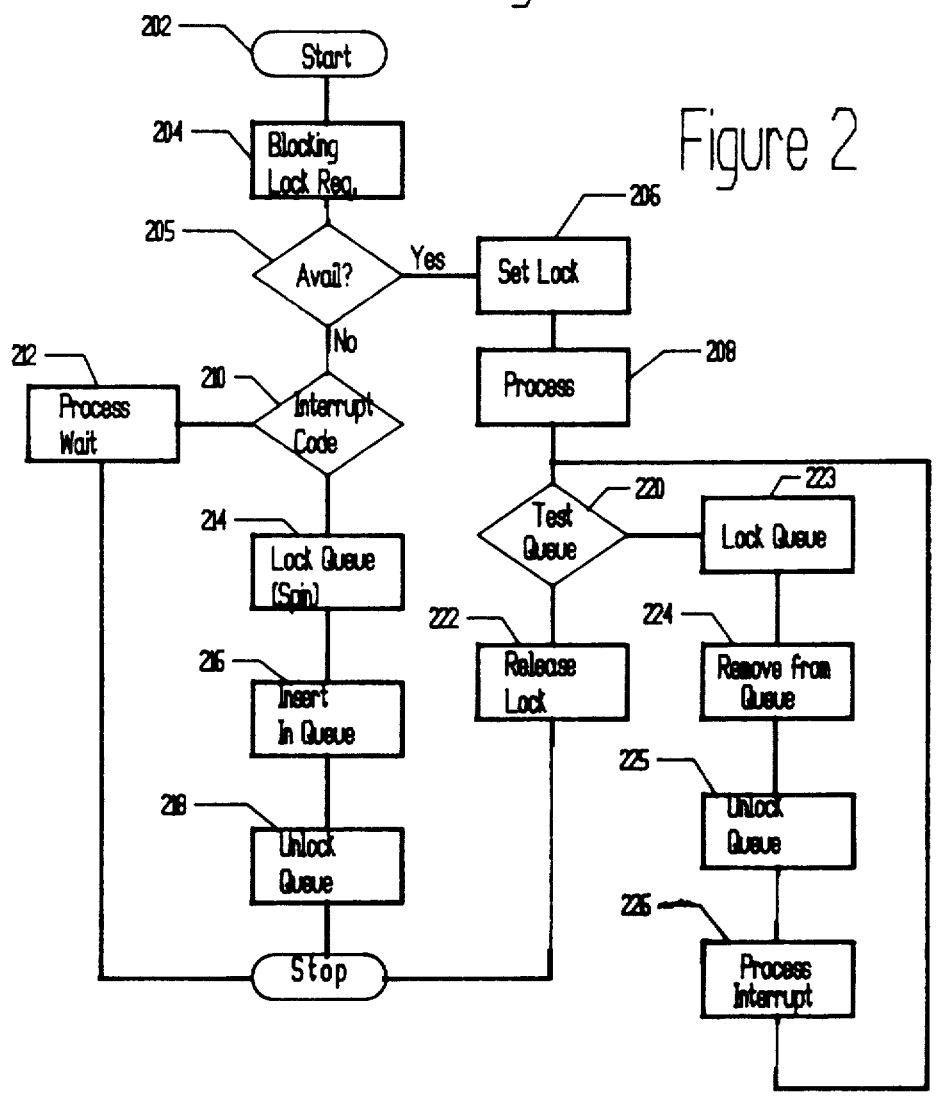
FIG. 2 is a flowchart depicting the process of serializing resource access according to the present invention.

A flowchart depicting the novel serialization method of the preferred embodiment of the present invention is shown in FIG. 2. The preferred embodiment establishes a blocking lock for each resource to which access must be serialized. This lock is established as a known memory location according to techniques known in the art. The method starts at step 202. A process requesting exclusive control of the resource issues a Request for a Blocking Lock 204. The system first determines whether or not the lock is available 205. If the lock is available it is assigned to the process by a Set Lock function 206. The lock is typically set using an atomic operation such as compare and swap on the IBM series computers. Once the lock is acquired, the locking process can carry out its processing steps 208. The inventive method allows process 208 to run with interrupts enabled thereby increasing system process effectiveness.

If the lock is found not available in step 205 the system next tests the type of process requesting the lock 210. If the process is not an interrupt, it is blocked causing the process to go into a wait state 212. If the request is from an Interrupt process, the request is enqueued in a deferred interrupt queue. The preferred embodiment avoids testing the type of process by providing one version of lock acquire and release code for execution by interrupt process and another version for execution by all other processes. Enqueuing requires the process to acquire a lock on the deferred queue itself 214 and, if unavailable, spin lock until it is released. Once the spin lock is available, the process inserts a deferred task record on the queue 216 and releases the lock 218. The queue is locked only during the insertion or deletion of an item from the queue and therefore the time spent in a spin lock will be short.

Figure 3:
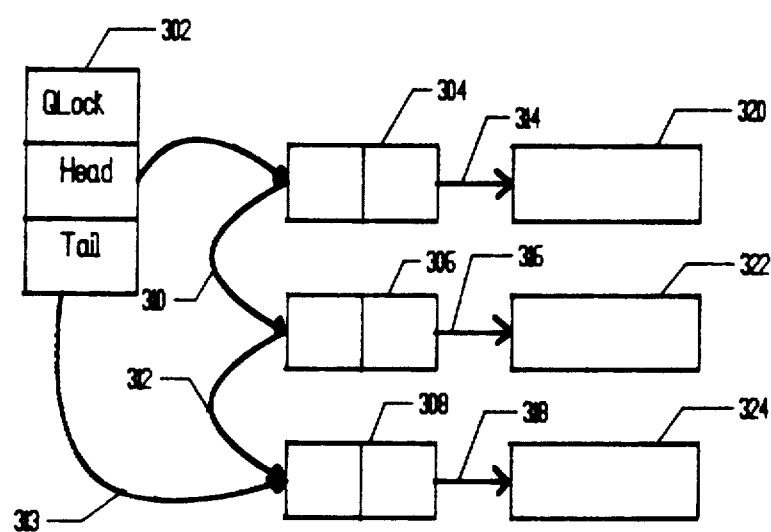
FIG. 3 is a block diagram illustrating the structure of a deferred work queue according to the present invention.

Process level code is disabled for interrupts only while the blocking and spin locks are tested or acquired. Thus, interrupts are disabled during steps 205 and 206, 214, 216, 218, 220 and 224 of FIG. 2. The deferred interrupt queue of the preferred embodiment maintains interrupts in the order received. The queues are maintained using known techniques and their exact content is immaterial to the present invention. An example of a queue used by the preferred embodiment is shown in FIG. 3. The Q lock structure 302 contains a pointer to the head 304 and tail 308 of the deferred queue. Each element in the queue has a pointer 310 312 to the next element and a pointer 314 316 318 to a caller supplied structure 320 322 324 containing the deferred work.

Process 208 executes until completion or until it must pause for other reasons. Note that process 208 does not need to run in an interrupt disabled state whether it is a Kernel Process or an Interrupt Process. Any interrupt generated will be handled by the queueing logic if related to the same resource. At completion, the system checks the deferred queue 220 to determine whether or not deferred interrupts exist. If none exist, the blocking lock is released 222 and the process is terminated, permitting any blocked process level work to be resumed. If deferred items exist, the first is removed 224 and processed 226. Removing the item from the deferred work queue requires acquiring a spin lock 223, removing the item 224, and releasing the lock 225. This removal and execution repeats until all deferred items are processed in the context of the lock holding process.

The above process executes for each resource to which access must be serialized. The elimination of spin locks and the need to disable interrupts during processing step 208 increases system throughput.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method for serializing requests for exclusive control of a resource shared by a plurality of computer processors, said processors operating to process a first task constituting process programming, and to process a second task constituting interrupt programming, said first and second tasks pluralities of instructions including said requests for exclusive control of said resource, said method comprising the steps of:

testing a resource lock to determine resource availability;

if said resource is available, assigning said resource lock to the task originating said request and granting said request;

if said lock is not available and said request does not originate from interrupt programming, blocking said request by suspending it from running and causing process control to pass to another runnable task;

if said lock is not available and said request does originate from interrupt programming, adding said request to an interrupt queue waiting for said resource;

when the task currently using said resource has finished using said resource, processing any requests in said interrupt queue; and releasing said resource lock only when all interrupt requests have been processed from said interrupt queue.

2. A method for serializing access to a computer system resource, said computer system having a plurality of processes and operating to execute a plurality of tasks, said tasks including at least process level tasks and interrupt tasks, said interrupt tasks receiving execution priority over said process level tasks, said system having a blocking lock for said resource indicating whether said resource is available to a task requesting access thereto, said lock being held by at most one task at a time, and a spin lock for controlling access to a referred request queue, the method comprising the steps of:

(a) testing to determine whether or not said blocking lock is held by another task;

(b) if said blocking lock is held by another task:
 (1) if access to said resource is being requested by a process level task, suspending said process level task until said blocking lock is released;
 (2) if access to said resource is being requested by an interrupt level task, acquiring said spin lock, enqueueing a deferred interrupt request in said deferred request queue, and releasing said spin lock;

(c) if said blocking lock is not held by another task;
 (1) granting access to said resource by acquiring said blocking lock and modifying said blocking lock to indicate acquisition;
 (2) performing task processing for said process level or interrupt level task that has acquired said blocking lock;
 (3) testing said deferred request queue when said process level or interrupt level task has finished using said resource to determine if any deferred interrupt requests are in said queue and, if so, acquiring said spin lock, dequeueing said deferred interrupt request, releasing said spin lock, and processing said deferred interrupt; and
 (4) releasing said block lock if no deferred requests are in said queue.

3. In a computer system in which a plurality of concurrently running tasks may request access to a common resource, said tasks comprising process level tasks and interrupt level tasks, said interrupt level tasks receiving execution priority over said process level tasks, said resource having a lock associated therewith indicating whether said resource is available to a task requesting access thereto, a method for handling requests by said tasks for access to said resource, comprising the steps of:

testing the lock associated with said resource to determine whether said lock is held by another task;

if said lock is not held by another task, acquiring said lock and providing the requesting task access to said resource;

if said lock is held by another task and the requesting task is a interrupt level task, placing the request in a queue for deferred access to said resource;

if said lock is held by another task and the requesting task is a process level task, blocking the requesting task until the task holding said lock has completed its use of said resource and any requests in said queue have been processed.

4. A method as in claim 3 in which said interrupt level tasks originate from interrupts which may be enabled or disabled, said interrupts being disabled before testing said lock and being reenabled after testing said lock.

5. A method as in claim 4 in which said interrupts are reenabled after acquiring said lock.

6. A method as in claim 3 in which access to said queue is controlled by a spin lock, said step of placing the request in a queue comprising the steps of acquiring said spin lock, inserting the request in said queue, and releasing said spin lock.

7. A method as in claim 6 in which said step of acquiring said spin lock comprises the steps of:

testing said spin lock to determine whether said spin lock is held by another task;

if said spin lock is not held by another task, obtaining said spin lock for said task;

if said spin lock is held by another task, retrying said spin lock until said spin lock is released.

8. A method as in claim 3 in which said interrupt level tasks originate from interrupts which may be enabled or disabled, said interrupts being disabled before placing a request in said queue and being reenabled after placing a request in said queue.

9. A method as in claim 3 comprising the further steps of:

testing said queue when the task currently accessing said resource has completed its use of said resource to determine whether said queue is empty;

if said queue is not empty, removing a request from said queue and processing said request; and if said queue is empty, releasing said lock.

10. A method as in claim 9 in which access to said queue is controlled by a spin lock, said step of removing said request at the head of said queue comprising the steps of acquiring said spin lock, removing said request from said queue, and releasing said spin lock.

11. A method as in claim 9 in which said interrupt level tasks originate from interrupts which may be enabled or disabled, said interrupts being disabled before removing a request in said queue and being reenabled after removing a request from said queue before processing said request.

* * * * *